United States Patent [19]
Marshall

[11] Patent Number: 5,309,759
[45] Date of Patent: May 10, 1994

[54] PEDAL CALCULATOR

[75] Inventor: Brian P. Marshall, Fort Wayne, Ind.

[73] Assignee: Navistar International Transportation Corp., Chicago, Ill.

[21] Appl. No.: 81,764

[22] Filed: Jun. 23, 1993

[51] Int. Cl.⁵ ......................................... G01M 15/00
[52] U.S. Cl. .................................................. 73/118.1
[58] Field of Search ................... 73/118.1, 1 D, 1 DC

[56] References Cited

U.S. PATENT DOCUMENTS

| | | | |
|---|---|---|---|
| 4,515,009 | 5/1985 | Hasegawa et al. | 73/118.1 |
| 4,567,756 | 2/1986 | Colborn | 73/118.1 |
| 5,133,321 | 7/1992 | Hering et al. | 123/399 |

*Primary Examiner*—Robert Raevis
*Attorney, Agent, or Firm*—Dennis K. Sullivan

[57] ABSTRACT

In a properly calibrated accelerator pedal sensor that provides a signal representative of pedal position to an electronic control module for the engine, the point at which the associated idle validation switch switches to distinguish idle from non-idle lies within a limited range of positions proximate closed throttle. The invention is a method for performing an in-vehicle test that can quickly determine if the switch point is in or out of calibration. A jumper is inserted between the sensor and the vehicle wiring harness that normally connects to the sensor. The jumper comprises several test points to which a voltmeter can be connected to measure certain voltages during the test and two LED's that are observed during the test. A special slide calculator is used to convert certain test data into a form that can be readily compared with other test data to make the determination regarding the idle validation switch.

18 Claims, 10 Drawing Sheets

FIG. 3A

PEDAL CALCULATOR
INSTRUCTION AND DATA ENTRY SHEET    62

1. With engine off, install Jumper 50.

2. Start engine and measure voltage between terminals 28 and 30 by attaching positive voltmeter lead to port 57 and ground (common) voltmeter lead to port 53.
   Record voltage: _____ volts.
   If measured voltage is less than +4.1 volts or greater than +5.9 volts, check vehicle wiring harness for proper wiring to ECM 12. If measured voltage is between +4.1 volts and +5.9 volts, continue with test.

3. Now attach positive voltmeter lead to port 55, leaving ground (common) voltmeter lead attached to port 53.

With pedal at idle, record voltage: ____ volts. This is Vidle.

With pedal at full throttle, record voltage: ____ volts. This is Vfull.

4. Using calculator 64, locate the value of Vfull on either face of slide 68 that is closest to the value of Vfull recorded above. Position the row containing that value of Vfull just above the row on jacket 68 that contains values of Vidle. The row on the opposite face of slide 68 that contains the same value of Vfull will also be just above the row of values of Vidle on the opposite jacket face.

5. Read the 3% Switch point that is immediately above the value of Vidle recorded above and enter. 3% Switch Point: ____ volts.

Read the 10% Switch point that is immediately above the value of Vidle recorded above and enter. 10% Switch Point: ____ volts.

6. Leave positive voltmeter lead attached to port 55, and ground (common) voltmeter lead attached to port 53. Position voltmeter so that both it and LED's 56 and 58 can be observed simultaneously.

Very slowly depress pedal and watch LED 58. Record voltage at which it first lights: _____ volts.

Very slowly release pedal from full throttle and watch LED 58. Record voltage at which it first goes out: _____ volts.

7. Leave positive voltmeter lead attached to port 55, and ground (common) voltmeter lead attached to port 53. Position voltmeter so that both it and LED's 56 and 58 can be observed simultaneously.

Very slowly depress pedal and watch LED 56. Record voltage at which it first goes out: _____ volts.

Very slowly release pedal from full throttle and watch LED 56. Record voltage at which it first lights: _____ volts.

8. Transfer all measurements to the following chart:

| From Step 5 | From Steps 6 and 7 | From Step 5 |
|---|---|---|
| 3% Switch Point | LED 56 lights: ____ volts<br>goes out: ____ volts<br>LED 58 lights: ____ volts<br>goes out: ____ volts | 10% Switch Point |
| _____ volts |  | _____ volts |

If all readings from Steps 6 and 7 are between 3% and 10% Switch Points, pedal is good. Do not replace pedal.

If any reading from Steps 6 and 7 is not between 3% and 10% Switch Points, replace pedal, and return it with this sheet to manufacturer.

FIG. 8

READ THE 3% SWITCH POINT ON THIS SIDE

1. FIND THE Vfull THAT IS CLOSEST TO YOUR READING IN THE GREEN AREA.

2. FIND THE Vidle THAT IS CLOSEST TO YOUR READING IN THE BLUE AREA.

3. THE 3% SWITCH POINT IS THE NUMBER ON THE SLIDE CHART JUST ABOVE THE BLUE Vidle NUMBER.

PEDAL CALCULATOR

FIELD OF THE INVENTION

This invention relates to testing an accelerator pedal sensor that has both a position sensing transducer providing a pedal position signal and an idle validation switch validating idle position, for the purpose of ascertaining whether or not the position at which the idle validation switch switches lies within an acceptable range of positions proximate closed throttle position.

BACKGROUND AND SUMMARY OF THE INVENTION

The typical automotive vehicle comprises an accelerator pedal for operating the vehicle's powerplant. Historically, mechanical linkages have been used to couple the pedal with a device that regulates the amount of fuel that is introduced into the engine. With the advent of electronics in controlling engines, coupling of an accelerator pedal with an engine can involve the use of an accelerator pedal sensor that converts a pedal position input into an electrical output that is delivered to an electronic control module (ECM) that in turn controls the engine.

One type of accelerator pedal sensor comprises a potentiometer whose tap is coupled with an accelerator pedal input such that the potentiometer output is correlated with the pedal input. Additionally, this accelerator pedal sensor comprises an idle validation switch that switches at a position proximate closed throttle position for the purpose of distinguishing between idle and non-idle. The position at which the idle validation switch switches is correlated with the position of the potentiometer tap, and when tolerances are taken into account, this position will, in an acceptable pedal sensor, lie within a range of acceptable positions proximate closed throttle. If the actual switching point lies outside of this range of acceptable positions, the sensor is deemed to be out of calibration, and hence unacceptable.

When a number of vehicles each having such an accelerator pedal sensor were placed in service, actual experience showed that testing of the accelerator pedal sensor was often performed as part of diagnostic procedures for those vehicles. The manufacturer's published test procedure for the sensor comprises a number of steps that are documented by eleven pages in a service manual. For whatever reason, actual experience has also shown that many of the accelerator pedal sensors that are deemed out of calibration by servicing personnel in the field, are actually found not to be out of calibration when returned to the manufacturer.

It is believed that a better testing procedure can significantly reduce the number of allegedly out-of-calibration sensors that are returned to the manufacturer and subsequently found not to be out of calibration. It is to an improved sensor testing procedure for achieving such reduction that the present invention is directed. By utilizing the improved procedure of the invention, it is believed that field servicing personnel will be better able to distinguish an out-of-calibration sensor from a properly calibrated one so that it will become less likely either that a properly calibrated sensor will be returned to the manufacturer under an erroneous warranty claim or that a customer will have to pay for replacement of a sensor that does not need to be replaced. Because it will eliminate many erroneous diagnoses, the method of the invention is expected to improve field servicing, and in turn, customer satisfaction.

The present invention provides several significant advantages over the prior procedure that spans eleven pages of a service manual: it can be performed more easily, more quickly, and more accurately. The economy in time and the improvement in accuracy should yield meaningful savings to the customer, the servicer, and the manufacturer, and lead to better relations among all concerned.

In a presently preferred embodiment of the inventive method, the only special equipment needed to perform a test comprises a special jumper, a special instruction and data entry sheet, and a special slide calculator. The special jumper is inserted between existing wiring connectors in a vehicle to enable the sensor to be tested without removing it from the vehicle. The special jumper comprises an interface box containing two LED indicators that are observed by servicing personnel during a test. The interface box also comprises test points to which servicing personnel can connect their own voltmeter to measure certain voltages during a test. The special instruction and data entry sheet provides an organized format for entry of certain data obtained during a test. This data is used in reaching a determination as to whether a sensor is in or out of calibration, and the sheet itself serves as a written record of the test data. The special slide calculator contains instructions for its own use and serves to enable certain test data be quickly converted into data against which other test data is compared in reaching the determination. A final piece of equipment that is used during a test is a voltmeter, preferably a digital one, which is typically a piece of standard service equipment belonging to servicing personnel.

A detailed description of the invention will now be given with reference to the accompanying drawings that show a presently preferred embodiment according to the best mode contemplated at this time for carrying out the invention.

BRIEF DESCRIPTION OF THE DRAWINGS

FIGS. 3A and 3B taken together comprise a representative special instruction and data entry sheet.

FIG. 8 is a front plan view of the slide calculator with the slide/part fully extended from the jacket part.

DESCRIPTION OF THE PREFERRED EMBODIMENT

Figure 1:
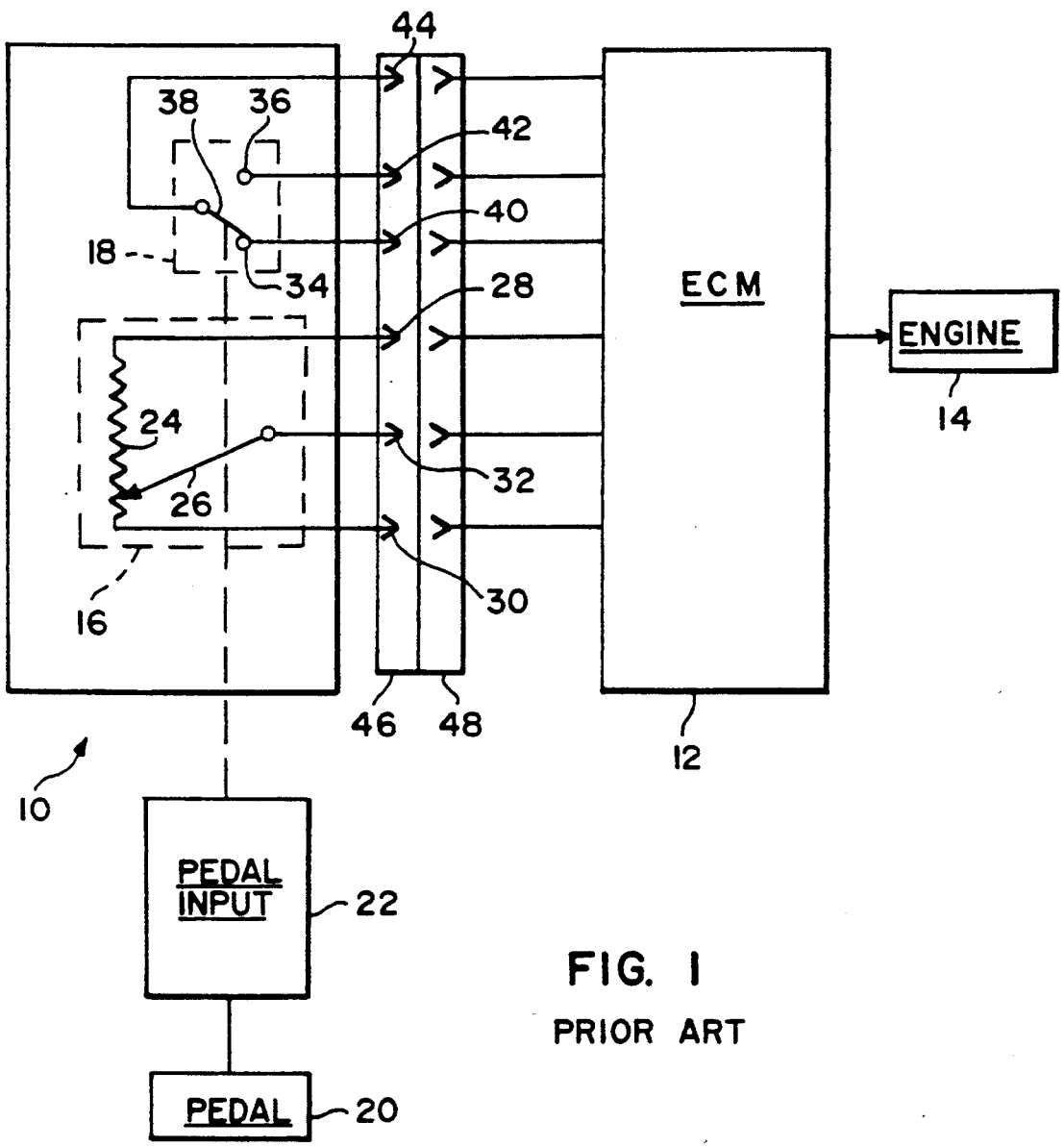
FIG. 1 is a general schematic diagram of an accelerator pedal sensor in association with an engine control.

FIG. 1 shows an accelerator pedal sensor 10 operatively connected to an electronic control module (ECM) 12 that controls an engine 14. ECM receives numerous other inputs (not shown) which in conjunction with input from pedal sensor 10 control the amount of fuel introduced into engine 14. FIG. 1 represents a known configuration that is typical for many automotive vehicles presently in service, especially trucks that have diesel engines as their powerplants.

Pedal sensor 10 comprises an accelerator pedal position transducer 16 and an idle validation switch 18. Movable portions of both transducer 16 and switch 18 are mechanically linked with the vehicle's accelerator pedal 20 by a pedal input 22.

Transducer 16 is a potentiometer comprising resistance 24 and a tap, or wiper, 26 that is positioned along resistance 24 by pedal input 22 in accordance with the position of pedal 20. Resistance 24 is connected between terminals 28 and 30 of transducer 16 while tap 26 is connected to a third terminal 32.

Switch 18 comprises two fixed switch contacts 34, 36 and a movable switch contact 38 that is operated by pedal input 22 to switch between the two fixed switch contacts 34 and 36 proximate closed throttle position for the purpose of distinguishing between idle and non-idle Contact 34 is connected to a fourth terminal 40 of switch 18, contact 36 to a fifth terminal 42, and contact 38 to a sixth terminal 44. FIG. 1 depicts closed throttle position.

Terminals 28, 30, 32, 40, 42, and 44 are contained within an electrical connector 46 that connects with a mating connector 48 of one of the vehicle wiring harnesses that eventually leads to ECM 12 to couple these six terminals to corresponding input terminals of ECM 12.

ECM 12 delivers to sensor 10 an input in the form of a steady DC voltage across resistance 24 via terminals 28 and 30. As tap 26 is operated by pedal input 22 away from closed throttle, an increasing fraction of the DC voltage across resistance 24 is output by sensor 10 to ECM 12 via terminal 32 and one or the other of terminals 28 and 30 to which the voltage at terminal 32 is referenced. Accordingly, the return voltage to ECM 12 is representative of the position of the pedal input over a range spanning closed throttle position and full throttle position. This return voltage is one of the inputs that is taken into account by ECM 12 in controlling engine 14.

The purpose of switch 18 is to validate idle and non-idle positions of pedal input 22 by switching at a position of pedal input that is proximate closed throttle position, typically within a few percent of closed throttle over the closed full throttle range. For example, a manufacturer may deem a switching point that is within a range of 3% to 10% of closed throttle acceptable for distinguishing between idle and non-idle. A pedal sensor that does not meet this criteria is deemed to be out of calibration. The method of the present invention related to making a determination as to whether the switching point is in or out of calibration.

Figure 2:
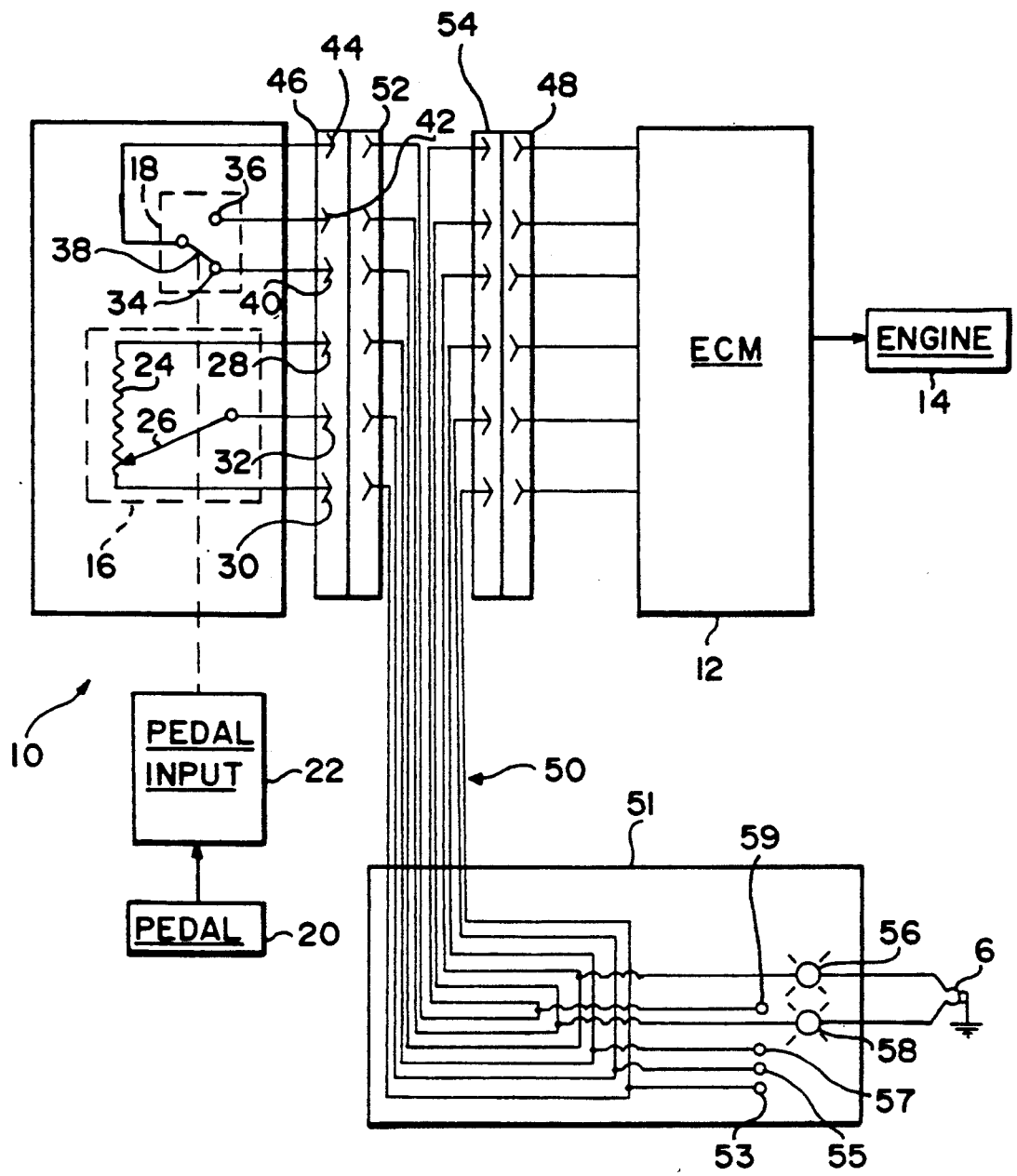
FIG. 2 is a schematic diagram similar to FIG. 1, but with a special jumper installed for the purpose of performing the test method of the invention.

The invention enables a test to be performed without removing sensor 10 from the vehicle by inserting a special jumper 50 between the sensor and ECM 12, as shown in FIG. 2. Jumper 50 is installed for the test by disconnecting connectors 46 and 48, connecting a connector 52 of jumper 50 with connector 46, and connecting a connector 54 of jumper 50 with connector 48. Jumper 50 has six wires that provide continuity of sensor 10 with ECM 12 in the same manner as before its installation. These wires pass through an interface box 51 of jumper 50 between connectors 52, 54. The interface box contains several test points, or ports, which connect with wires passing through the interface box and to which leads of a voltmeter can be connected during the test. One port 53 connects to the wire extending between terminal 30 and ECM 12; another port 55, to the wire extending between terminal 32 and ECM 12; a third port 57, to the wire extending between terminal 28 and ECM 12; and a fourth port 59, to the wire extending between terminal 44 and ECM 12. Additionally, the interface box has two light emitting diodes (LED's) 56 and 58 that are used as indicators during the test. One terminal of each LED is connected to a common clip 6 that is connected to a point of common potential, such as ground. The other terminal of LED 56 is connected directly to the wire passing through the interface box that has continuity to fixed switch contact 34, and the other terminal of LED 58 is connected directly to the wire passing through the interface box that has continuity to the other fixed switch contact 36. ECM 12 delivers a potential to movable contact 38 that is sufficient relative to the common potential at the clip side of both LED's to light LED 56 when movable switch contact 38 is making contact with fixed switch contact 34 and to light LED 58 when contact 38 is making contact with contact 36.

Once jumper 50 has been installed in the manner just described, testing can commence. The test will now be described with reference to FIGS. 3A and 3B. These Figs. show an exemplary instruction and data entry sheet 62 containing a set of numbered instructions and spaces where data is to be entered. Instruction #1 refers to the installation of jumper 50 just described.

Instruction #2 involves measuring the voltage that is supplied from ECM 12 across resistance 24. The measurement is taken by connecting the voltmeter leads to ports 53 and 57, respectively. The measured voltage must be within a certain range in order for a valid test to be performed on sensor 10, and therefore the testing of the sensor can validly proceed only when the voltage across resistance 24 is within a specified range of acceptable voltage values.

If the voltage across resistance 24 is measured as acceptable, then the servicer proceeds to Instruction #3. The servicer now connects the voltmeter leads to ports 53 and 55, respectively to measure the output voltage that is being returned from potentiometer 16 to ECM 12 via terminals 30 and 32, terminal 30 being ground (common), first when the pedal is in idle and then when it is operated to full throttle. These measurements are entered in the appropriate blank spaces of Instruction #3, and the testing then proceeds to Instruction #4.

Instruction #4 involves the use of a calculator that converts the two measurements of Instruction #3 into two measurements defining upper and lower limits of a range of acceptable values of the potentiometer output at which movable switch contact 38 should switch between fixed switch contacts 34 and 36. The calculator appears in FIGS. 4-9 where it is identified by the numeral 64, and the calculator will now be described with reference to those Figs. before further description of the test procedure is given.

Calculator 64 comprises a jacket 66 and a slide 68 that is positionable relative to jacket 66 over a range of positions extending between a fully retracted position and a fully extended position. Both jacket and slide are rectangular with the jacket being just slightly wider. The jacket comprises two confronting panels, a front panel 70 and a rear panel 72, that are joined along their lengthwise extending margins to provide a slot that guides slide 68 in a straight line as it is being extended from and retracted into jacket 66. Slide 68 is a single panel having a front face 74 and a rear face 76.

Figure 4:
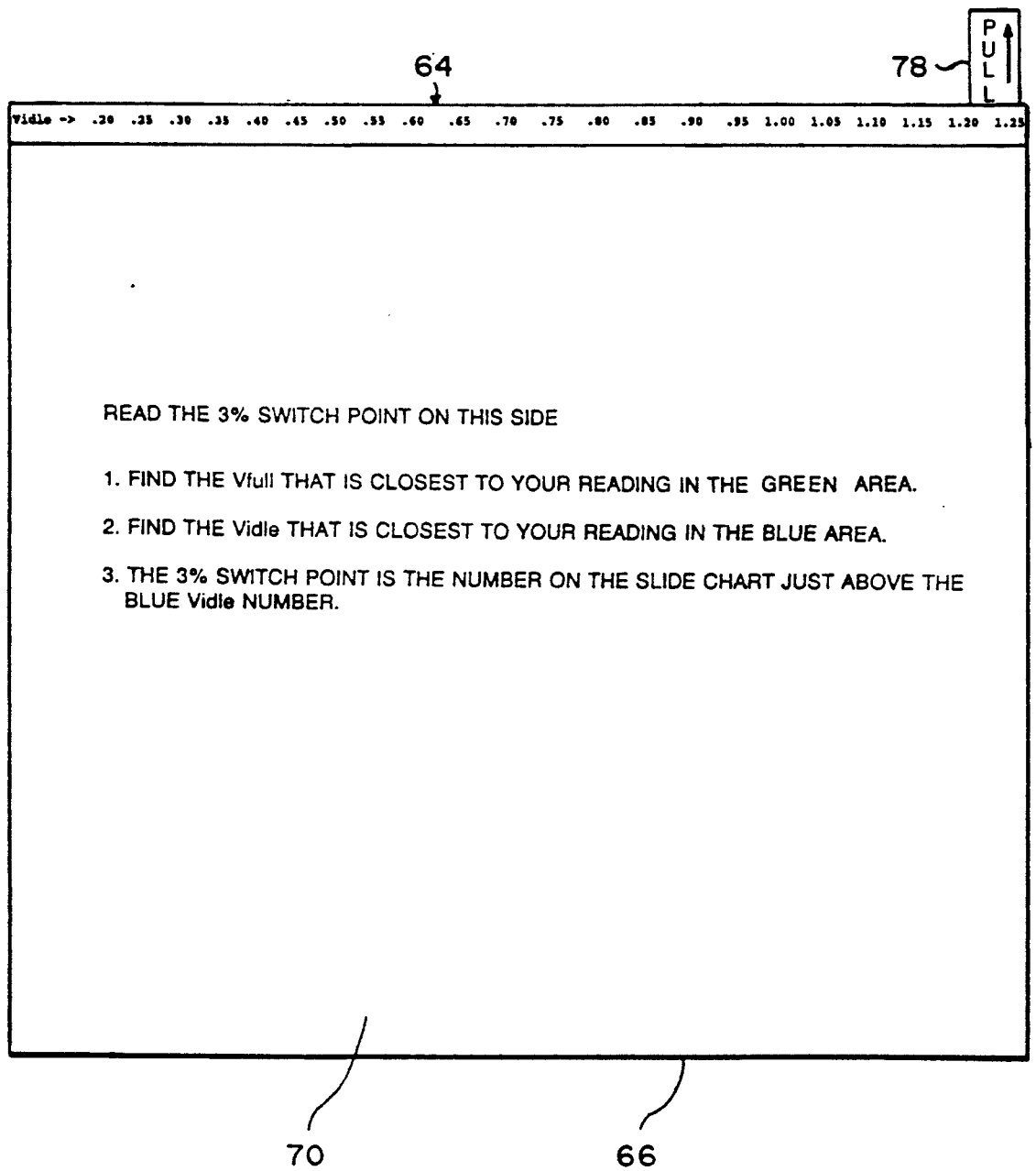
FIG. 4 is a front plan view of a representative special slide calculator with the slide part in a full retracted position within a jacket part.
Figure 5:
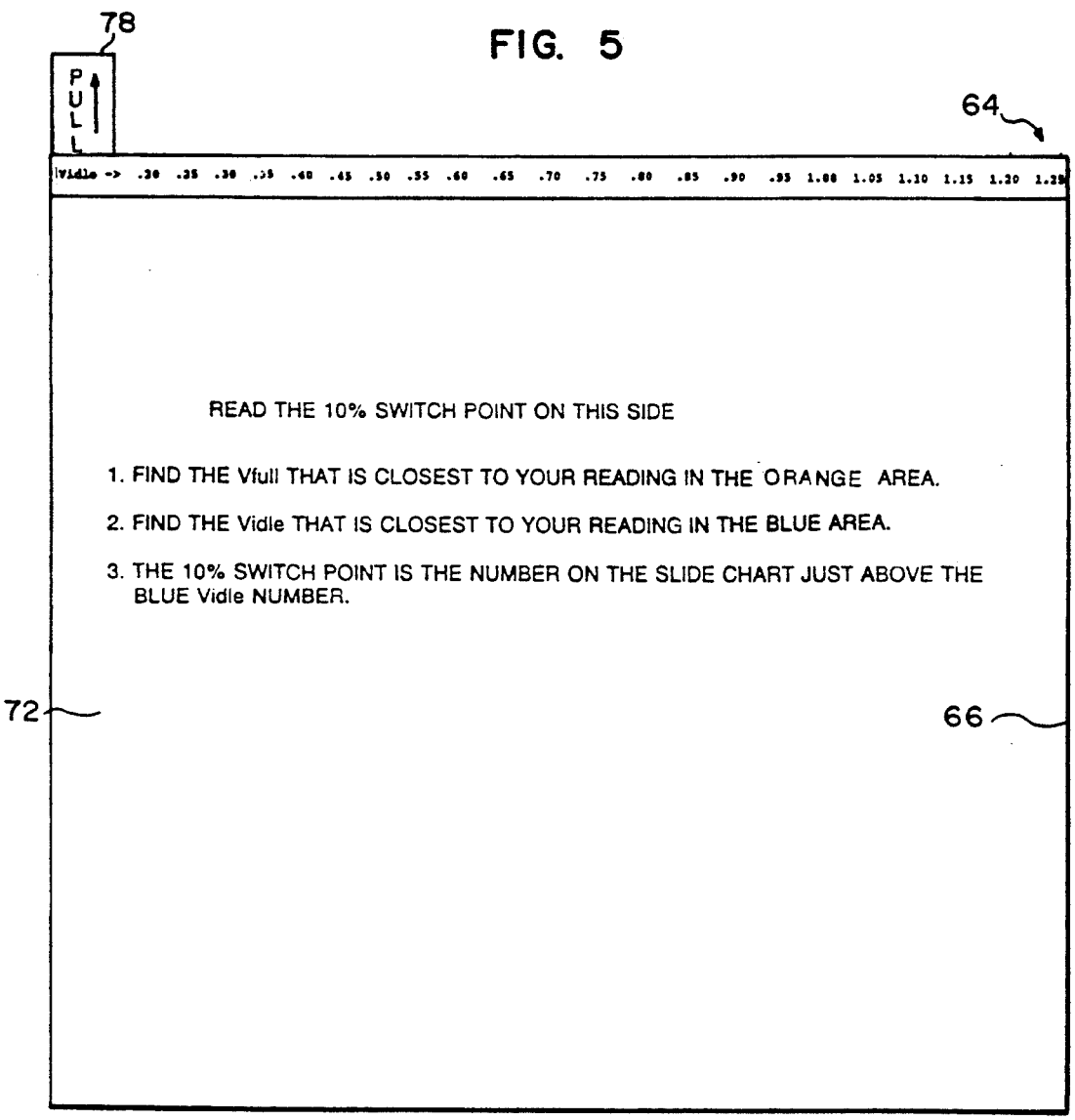
FIG. 5 is a rear plan view of FIG. 4.
Figure 6:
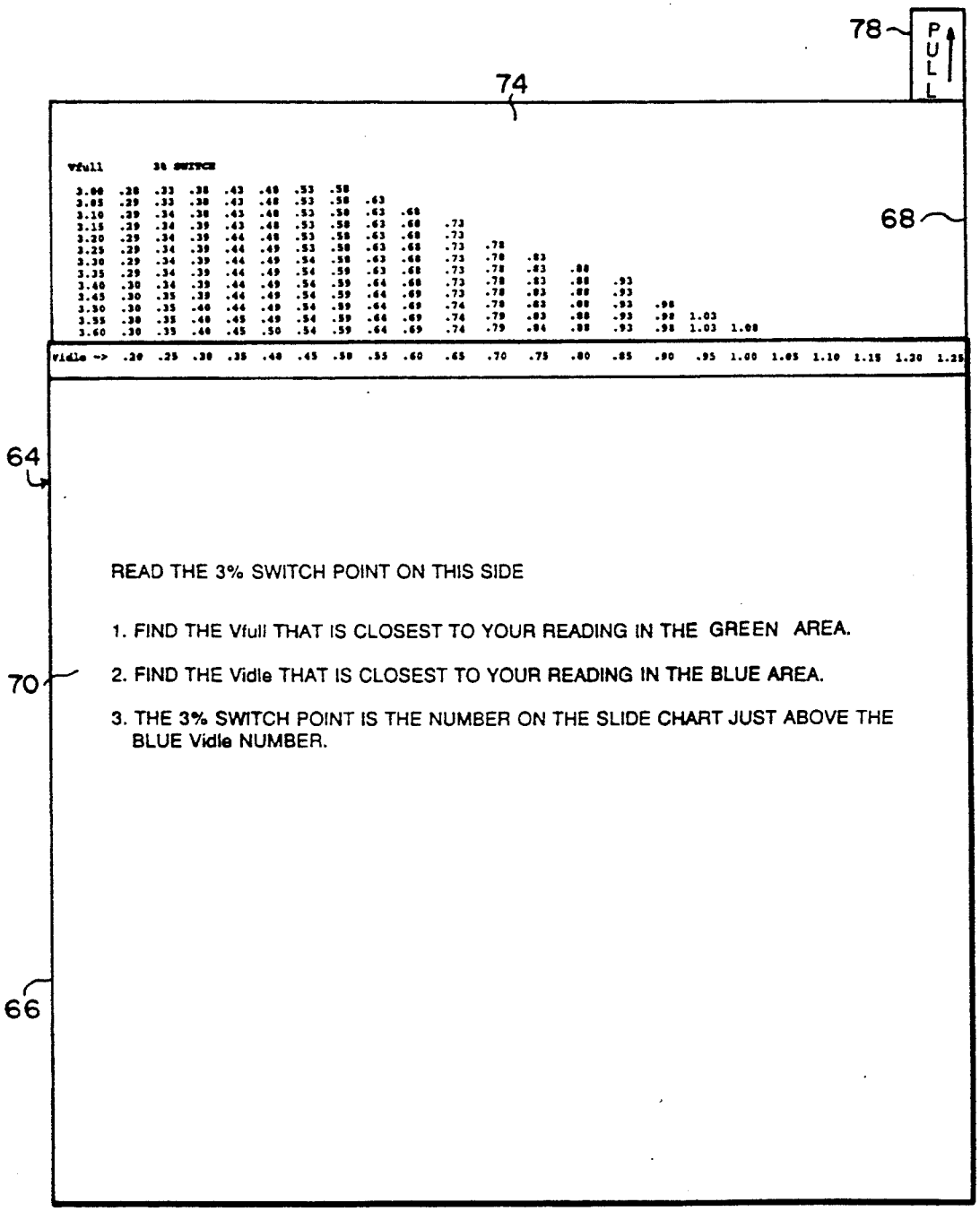
FIG. 6 is a front plan view of the slide calculator with the slide part partially extended from the jacket part.
Figure 7:
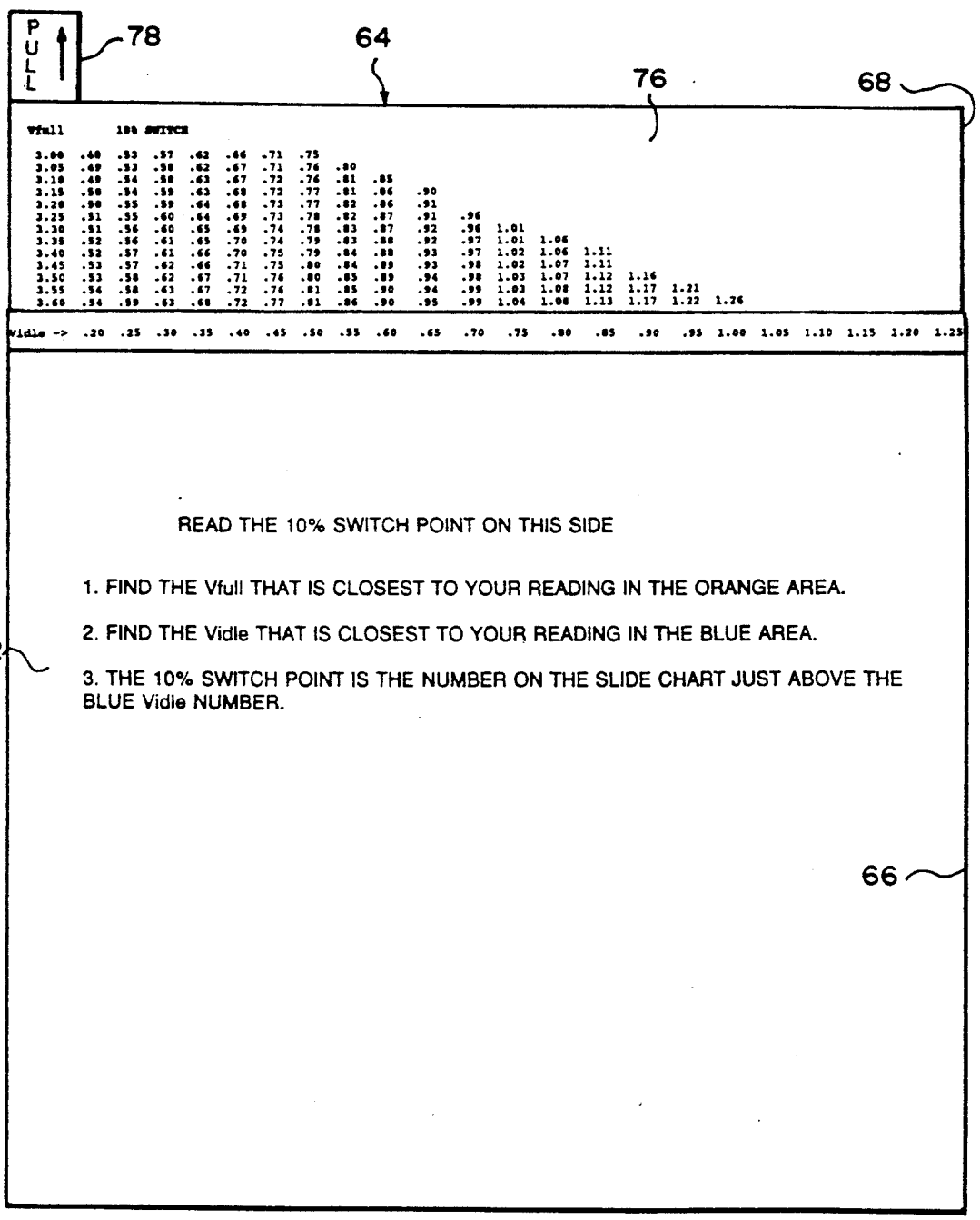
FIG. 7 is a rear plan view of FIG. 6.
Figure 9:
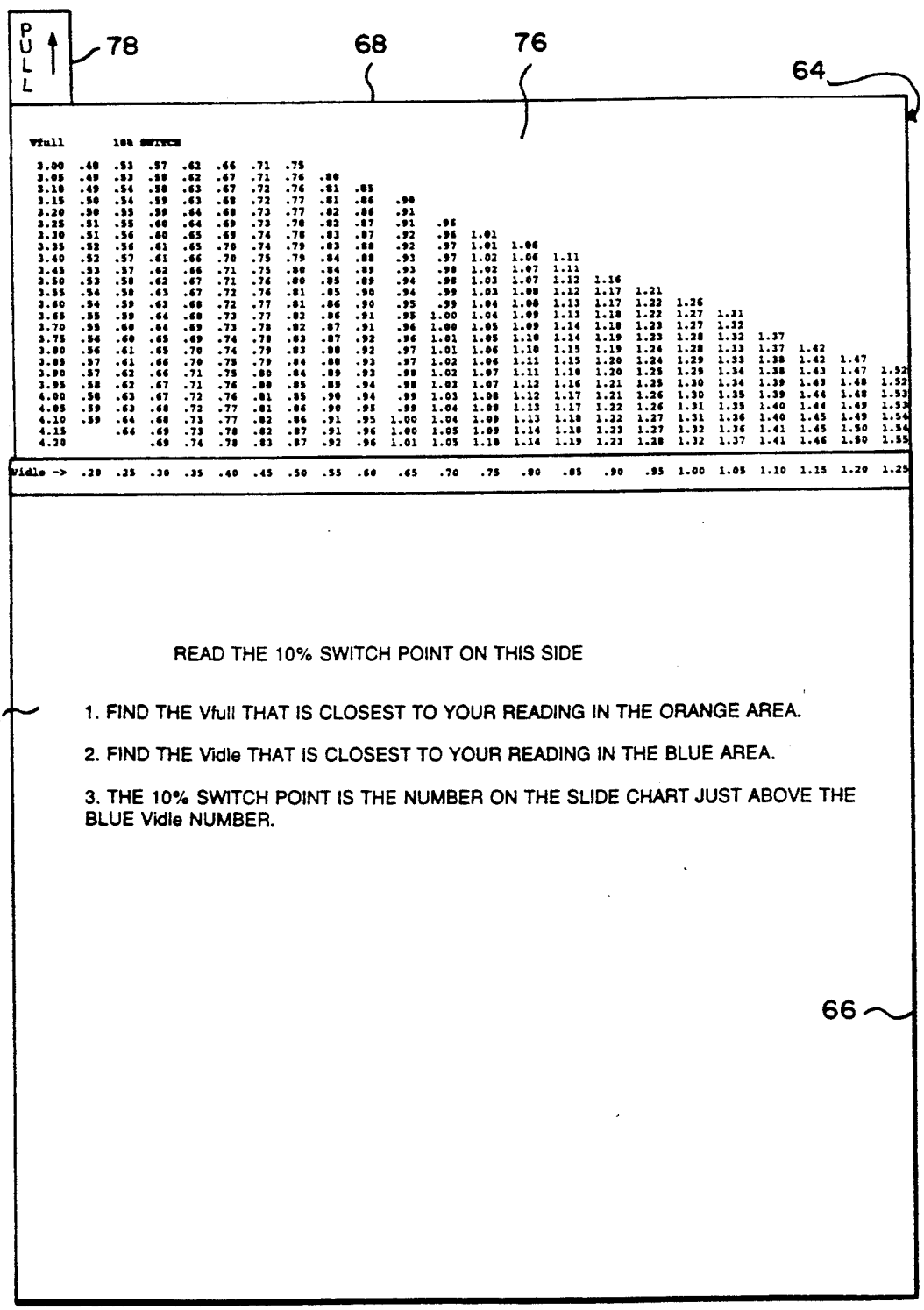
FIG. 9 is a rear plan view of FIG. 8.

FIGS. 4 and 5 show calculator 64 with slide 68 fully retracted within a jacket 66; FIGS. 6 and 7, with the slide partially extended; and FIGS. 8 and 9, with the slide fully extended. In order to facilitate operating the slide from fully retracted position, a device such as a pull tab 78 is provided.

The exterior face of front panel 70 contains certain instructions for use of the calculator, and the exterior face of rear panel 72 also contains a set of instructions. In addition, the upper widthwise margin of the exterior face of front panel 70, contains a row of values of a parameter defined as Vidle. There are twenty-two values, as shown, at 0.05 volt increments, beginning at 0.20 volt and ending at 1.25 volt. And, the upper widthwise margin of the exterior face of rear panel 72 contains a row of values of Vidle identical to the row on front panel 70. These two rows of values of Vidle are distinctively highlighted for use, and in the illustrated embodiment, they are contained with an area that is colored blue. This is the "Blue Area" that is being referred to in the second instruction on each panel 70, 72.

When slide 68 is extended, either partially or fully, a row of values of a parameter defined as Vfull appears along the lengthwise extending left margin on each slide face 74, 76. Each value of Vfull is at one end of a widthwise extending row of values of a parameter defined as 3% Switch Point in the case of values on front face 74 and as 10% Switch Point in the case of values on rear face 76. The 3% Switch Point values are arranged as a series of columns each of which is in alignment with a corresponding one of the Vidle values in the "Blue Area" on front jacket panel 70, while the 10% Switch Point values are arranged as a series of columns each of which is in alignment with a corresponding one of the Vidle values in the "Blue Area" on rear jacket panel 72.

Each column at 0.05 volt increments, of values of Vfull comprises twenty-five values, as shown, beginning at 3.00 volts and ending at 4.20 volts. These columns are also distinctively highlighted for use, and in the illustrated embodiment, they are contained within respective, distinctively colored areas. The values of Vfull on rear face 76 are contained within the "Orange Area" mentioned in the first instruction on rear jacket panel 72 while the values of Vfull on front face 74 are contained within the "Green Area" that is mentioned in the first instruction on front jacket panel 70. The information is arranged on each face 76, 74 such that when the slide is extended to a position where a particular value of Vfull, and the corresponding row of values of the 3% Switch Point become fully visible immediately proximate the upper widthwise margin of front panel 70, the same value of Vfull and its corresponding row of values of the 10% Switch Point have also just become fully visible immediately proximate the upper widthwise margin of rear panel 72. An example of this is shown by FIGS. 6 and 7.

From the foregoing description of calculator 64, it may be recognized that the values of Vidle and Vfull on the front of the calculator constitute a two-dimensional matrix wherein one dimension comprises the values of Vidle and the other, the values of Vfull. The values of the 3% Switch Point constitute an array wherein each value is at the intersection of a particular value of Vidle and a particular value of Vfull. Likewise, the values of Vidle and Vfull on the rear of the calculator constitute another two dimensional matrix wherein one dimension comprises the values of Vidle and the other, the values of Vfull. The values of the 10% Switch Point constitute another array wherein each value is at the intersection of a particular value of Vidle and a particular value of Vfull.

Details of calculator 64 having now been described, it is appropriate to return to Instruction #4 of the instruction and data entry sheet in FIGS. 3A and 3B. This instruction is performed by positioning slide 68 such that the value of Vfull in the Green and Orange Areas that is closest to the value of Vidle obtained from the measurement of Instruction #3 is immediately above the row of values of Vidle in the Blue Areas. The value of Vidle in the Blue Areas closest to the idle measurement value recorded during performance of Instruction #3 is then used to locate the values of the 3% Switch Point and the 10% Switch Point on the respective faces of the calculator. The value of the 3% Switch Point is immediately above the selected Vidle value on the front of the calculator while the 10% Switch Point value is immediately above the same Vidle value on the rear of the calculator. These 3% Switch Point and 10% Switch Point values are then entered in the blank spaces for them in Instruction #5.

The test proceeds next to Instruction #6. The servicer's voltmeter is connected to ports 53 and 55 to measure the voltage at tap 26 relative to ground (common), i.e. the output voltage of potentiometer 16 across terminals 32 and 30. The pedal is slowly depressed as instructed, and the servicer makes the measurement requested, entering in the appropriate space in Instruction #6 the voltage that the voltmeter measures across terminals 32 and 30 when LED 58 lights. The pedal is depressed to full throttle position and then slowly released. The servicer makes the second measurement requested, entering the voltage that the voltmeter measures when LED 58 goes out in the appropriate space in Instruction #6.

Instruction #7 is then executed. The pedal is slowly depressed as instructed and the servicer makes the measurement requested, entering in the appropriate space in Instruction #7 the voltage that the voltmeter measures across terminals 32 and 30 when LED 56 goes out. The pedal is depressed to full throttle and then slowly released. The servicer makes the second measurement requested, entering the voltage that the voltmeter measures when LED 56 lights in the appropriate space in Instruction #7.

To facilitate a determination as to whether a sensor is in or out of calibration, it is convenient to transfer the measurements taken to the chart of Instruction #8. A sensor that is in calibration will have all four measurements from Instructions #6 and #7 within the limits obtained from Instruction #5. If any one of the four is outside these limits, the sensor is deemed to be out of calibration.

The following is an example of an accelerator pedal sensor 10 with which the method of the present invention may be practiced for the purpose of illustrating the derivation of the values on calculator 64. The sensor is designed to receive a nominal +5.000 volts input across terminals 28 and 30, terminal 30 being ground (common) and terminal 28 receiving the nominal +5.000 volts. The actual voltage may lie in a range from +4.700 volts to +5.200 volts and still be within specification. This voltage is designated Vref.

Maximum full throttle is defined to equal Vref X 81%; maximum allowable span is defined to equal Vref x 68%; minimum allowable span is defined to equal Vref x 60%; and minimum closed throttle is defined to equal Vref x 5%. At Vref=+4.700 volts, maximum full throttle = +3.807 volts, maximum allowable span = +3.196 volts, minimum allowable span = +2.820 volts, and minimum closed throttle = +0.235 volt. At Vref = +5.200 volts, maximum full throttle = +4.212 volts, maximum allowable span = +3.536 volts, minimum allowable span = +3.120 volts, and minimum closed throttle = +0.260 volt.

These yield the largest usable range of Vidle from +0.235 volt to +1.092 Volt and the largest usable range of Vfull from +3.055 volts to +4.212 volts. Note: The +1.092 volt value is obtained by subtracting the minimum allowable span at Vref = +5.200 volts from the maximum full throttle voltage at Vref = +5.200 volts; and the +3.055 volt value is obtained by adding the minimum allowable span at Vref = +4700 volts to the minimum closed throttle voltage at Vref = +4.700 volts.

The range of Vidle on calculator 64 is based on this calculated largest usable range of Vidle, and the range of Vfull on calculator 64 is based on this calculated largest usable range of Vfull. The 0.05 volt increment for both ranges was deemed satisfactory for the sake of size and practicality. Typical voltmeters can read voltages to two decimal places.

Calculator 64 in effect performs the following computation:
1) Measure output voltage of potentiometer 16 at full throttle (Vfull).
2) Measure output voltage of potentiometer 16 at idle (Vidle).
3) Subtract the latter measurement from the former to obtain the span (Vspan).
4) Calculate the 3% Switch Point by adding 3% of the span (Vspan) to output voltage of the potentiometer at idle (Vidle).
5) Calculate the 10% Switch Point by adding 10% of the span (Vspan) to output voltage of the potentiometer at idle (Vidle).

The method that has been described for testing sensor 10 automatically takes switch hysteresis into account. Typically, hysteresis must be taken into account, but if a switch had sufficiently small hysteresis, it might not be necessary to perform measurements in both directions of pedal operation, one direction being sufficient.

The use of the instruction and data entry sheet provides a written record of test data that may be required to accompany a sensor that is returned to the manufacturer under a warranty claim. Such a requirement may be important if a warranty claim is disputed, and it may be useful in discouraging unnecessary pedal replacement. In this regard, it should be pointed out that the pedal and the sensor are typically a single assembly that is replaced in its entirety if the sensor is found to be out of compliance with relevant specifications.

The calculator that has been illustrated and described is a useful tool that can be relatively inexpensively fabricated in quantity for distribution to service facilities throughout the country. The method of the invention may however be practiced with other equivalent forms of calculator, even to the point of using manual calculations although they are ostensibly more prone to human error and inaccuracy.

Likewise, the instruction and data entry sheet that has been described is a useful tool for practicing the inventive method which is relatively inexpensive and convenient, but it is to be appreciated that the method can be practiced without using the specific sheet that has been described.

The sensor that has been illustrated and described uses a potentiometer for giving the pedal position signal, and it is to be appreciated that principles of the method of the invention extend to sensors that may have electric circuit elements that present parameters other than resistance.

While a presently preferred embodiment has been illustrated and described, principles of the invention are applicable to other embodiments that fall within the scope of the following claims.

What is claimed is:

1. For testing an accelerator pedal sensor for an automotive vehicle accelerator pedal that operates over a range extending from idle to full throttle to correspondingly operate a powerplant for powering the vehicle, said accelerator pedal sensor comprising an accelerator pedal position sensing device for providing an accelerator pedal position signal and an idle validation switch for validating idle and non-idle positions, said sensing device comprising means that presents a certain electric circuit parameter via first terminal means of said sensor to which a reference electrical input is applied, and selection means that is operated by an accelerator pedal input to present via second terminal means of said sensor an electrical output representing pedal position over a range extending from a closed throttle position to a full throttle position, said idle validation switch comprising first and second fixed switch contacts and a third movable switch contact that is operated by the pedal input to switch between said first and second fixed switch contacts at a position proximate closed throttle position, a method comprising the steps of:

measuring the value of the reference electrical input applied to said first terminal means to determine if it is within a specified acceptable range;

if the value of the reference electrical input to said first terminal means is within such specified acceptable range, measuring the value of the electrical output at said second terminal means with the pedal input in idle position, and measuring the value of the electrical output at said second terminal means with the pedal input in full throttle position;

converting the measured values of the electrical output at said second terminal means with the pedal input in idle and full throttle positions into a range of acceptable values at which said third movable switch contact should switch between said first and second fixed switch contacts;

operating the pedal input from idle position to a non-idle position and during such operation measuring the value of the electrical output at said second terminal means at which said third movable switch contact ceases to make contact with one of said first and second fixed switch contacts and the value of the electrical output at said second terminal means at which said third movable switch contact begins to make contact with the other of said first and second fixed switch contacts;

operating the pedal input from a non-idle position to idle position and during such operation measuring the value of the electrical output at said second terminal means at which said third movable switch contact ceases to make contact with said other of said first and second fixed switch contacts and the value of the electrical output at said second terminal means at which said third movable switch contact begins to make contact with said one of said first and second fixed switch contacts;

and comparing the measured values of the electrical output at said second terminal means obtained during the first-mentioned operating step of operating the pedal input from idle to non-idle and during the second-mentioned operating step of operating the pedal input from non-idle to idle with said range of acceptable values at which said third movable switch contact should switch between said first and second fixed switch contacts.

2. A method as set forth in claim 1 in which the first-mentioned operating step of operating the pedal input from idle position to a non-idle position comprises operating the pedal input from idle position to full throttle position, and the second-mentioned operating step of operating the pedal input from a non-idle position to idle position comprises operating the pedal input from full throttle position to idle position.

3. A method as set forth in claim 1 in which said method is performed while the sensor is in such an automotive vehicle by inserting a jumper between existing wiring connectors of such a vehicle, such jumper comprising indicator means for circuit association with said first, second, and third switch contacts for indicating the beginning and the ceasing of said third movable switch contact making contact with said first and second fixed switch contacts, and terminal means to which an electrical measuring instrument can be connected to measure the electrical output at said second terminal means.

4. A method as set forth in claim 1 in which the step of converting the measured values of the electrical output at said second terminal means with the pedal input in idle and full throttle positions into a range of acceptable values at which said third movable switch contact should switch between said first and second fixed switch contacts is performed before the first-mentioned operating step of operating the pedal input from idle position to a non-idle position and before the second-mentioned operating step of operating the pedal input from a non-idle position to idle position.

5. A method as set forth in claim 1 in which the step of converting the measured values of the electrical output at said second terminal means with the pedal input in idle and full throttle positions into a range of acceptable values at which said third movable switch contact should switch between said first and second fixed switch contacts comprises converting by utilizing a calculator comprising a two-dimensional matrix means wherein a first dimension comprises various values of the electrical output at said second terminal means when the pedal input is in idle position and a second dimension comprises various values of the electrical output at said second terminal means when the pedal input is in full throttle position, and wherein the intersection of each value of said first dimension with each value of said second dimension defines upper and lower limits of said range of acceptable values at which said third movable switch contact should switch between said first and second fixed switch contacts for the particular value of said first dimension and the particular value of said second dimension that define the intersection.

6. A method as set forth in claim 5 in which said two-dimensional matrix means comprises first and second matrices each having said first dimension and said second dimension, and wherein the intersection of each value of said first dimension with each value of said second dimension in said first matrix defines the lower limit of said range of acceptable values at which said third movable switch contact should switch between said first and second fixed switch contacts for the particular value of said first dimension and the particular value of said second dimension that define the intersection, and wherein the intersection of each value of said first dimension with each value of said second dimension in said second matrix defines the upper limit of said range of acceptable values at which said third movable switch contact should switch between said first and second fixed switch contacts for the particular value of said first dimension and the particular value of said second dimension that define the intersection, and said converting step of converting the measured values of the electrical output at said second terminal means with the pedal input in idle and full throttle positions into a range of acceptable values at which said third movable switch contact should switch between said first and second fixed switch contacts comprises utilizing said first matrix to obtain the lower limit of said range and utilizing said second matrix to obtain the upper limit of said range.

7. A method as set forth in claim 6 in which said calculator comprises two relatively positionable parts, one of which contains said first dimension of both matrices, and the other of which contains said second dimension of both matrices, the values at the intersections of the values of said first dimension of said first matrix with the values of said second dimension of said first matrix, and the values at the intersections of the values of said first dimension of said second matrix with the values of said second dimension of said second matrix, and said converting step comprises relatively positioning said two parts to register a particular value of said second dimension of both of said matrices relative to said one of said parts.

8. A method as set forth in claim 5 in which said calculator comprises two relatively positionable parts, one of which contains said first dimension and the other of which contains both said second dimension and the values at the intersections of the values of said first dimension with the values of said second dimension, and said converting step comprises relatively positioning said two parts to register a particular value of said second dimension relative to said one of said parts.

9. A method as set forth in claim 1 in which said means that presents a certain electric circuit parameter via said first terminal means of said sensor to which a reference electrical input is applied comprises resistance that is presented between a first terminal and a second terminal of said sensor across which a reference voltage is applied, said selection means that is operated by an accelerator pedal input to present via second terminal means of said sensor an electrical output representing pedal position over a range extending from a closed throttle position to a full throttle position comprises a tap that is operated by the pedal input to move along said resistance in accordance with the pedal input and deliver across a third terminal of said sensor and one of said first and second terminals of said sensor, an output voltage representing the pedal input, said step of measuring the value of the reference electrical input applied to said first terminal means to determine if it is within a specified acceptable range comprises measuring the value of the reference voltage applied across said first and second terminals to determine if it is within a specified acceptable voltage range, said step of measuring the value of the electrical output at said second terminal means with the pedal input in idle position and of measuring the value of the electrical output at said second terminal means with the pedal input in full throttle position comprises measuring the value of output voltage across said third terminal and said one of said first and second terminals with the pedal input in idle position and measuring the value of the output voltage across said third terminal and said one of said first and second terminals with the pedal input in full throttle position, said step of converting the measured values of the electrical output at said second terminal means with the pedal input in idle position and in full throttle position into a range of acceptable values at which said third movable switch contact should switch between said first and second fixed switch contacts comprises converting both the value of the output voltage across said third terminal and said one of said first and second terminals measured with the pedal input in idle position and the value of the output voltage across said third terminal and said one of said first and second terminals measured with the pedal input in full throttle position into a range of acceptable voltages at which said third movable switch contact should switch between said first and second fixed switch contacts, said first-mentioned operating step comprises measuring, during the operation of the pedal input from idle position to a non-idle position, both the value of the output voltage across said third terminal and said one of said first and second terminals at which said third movable switch contact ceases making contact with said one of said first and second fixed switch contacts and the value of the output voltage across said third terminal and said one of said first and second terminals at which said third movable switch contact begins making contact with the other of said first and second fixed switch contacts, said second-mentioned operating step comprises measuring, during the operation of the pedal input from a non-idle position to idle position, both the value of the output voltage across said third terminal and said one of said first and second terminals at which said third movable switch contact ceases making contact with said other of said first and second fixed switch contacts and the value of the output voltage across said third terminal and said one of said first and second terminals at which said third movable switch contact begins making contact with said one of said first and second fixed switch contacts, and said comparing step comprises comparing the measured values of output voltage across said third terminal and said one of said first and second terminals obtained during said first-mentioned and second-mentioned operating steps with said range of acceptable voltages at which said third movable switch contact should switch between said first and second fixed switch contacts.

10. A method as set forth in claim 9 in which said method is performed while the sensor is in such an automotive vehicle by inserting a jumper between existing wiring connectors of such a vehicle, such jumper wiring harness comprising indicator means for circuit association with said first, second, and third switch contacts for indicating the beginning and the ceasing of said third movable switch contact making contact with said first and second fixed switch contacts, and terminal means to which an electrical measuring instrument can be connected to measure the electrical output at said second terminal means.

11. A method as set forth in claim 10 in which said indicator means comprises a first LED associated with said first and third switch contacts and a second LED associated with said second and third switch contacts.

12. A method as set forth in claim 1 in which said step of converting the measured values of the electrical output at said second terminal means with the pedal input in idle and full throttle positions into a range of acceptable values at which said third movable switch contact should switch between said first and second fixed switch contacts comprises defining upper and lower limits of said range of acceptable values at which said third movable switch contact should switch between said first and second fixed switch contacts.

13. In a method for testing an accelerator pedal sensor for an automotive vehicle accelerator pedal that operates over a range extending from idle to full throttle to correspondingly operate a powerplant for powering the vehicle, said accelerator pedal sensor comprising an accelerator pedal position sensing device for providing an accelerator pedal position signal and an idle validation switch for validating idle and non-idle positions, said sensing device comprising means that presents a certain electric circuit parameter via first terminal means of said sensor to which a reference electrical input is adapted to be applied, and selection means that is operated by an accelerator pedal input to select from said first-mentioned means and present via second terminal means of said sensor an electrical output representing pedal position over a range extending from a closed throttle position to a full throttle position, said idle validation switch comprising first and second fixed switch contacts and a third movable switch contact that is operated by the pedal input to switch between said first and second fixed switch contacts at a position proximate closed throttle position, the steps of:

applying a predetermined reference electrical input to said first terminal means and concurrently both measuring the value of the electrical output at said second terminal means with the pedal input in one known position within an idle range extending from idle position to a position short of the position at which said third movable switch contact switches from making contact with one of said first and second fixed switch contacts to making contact with the other of said first and second fixed switch contacts and measuring the value of the electrical output at said second terminal means with the pedal input in another known position within a non-idle range extending to full throttle position from a position beyond the position at which said third movable switch contact has switched from making contact with said one of said first and second fixed switch contacts to making contact with said other of said first and second fixed switch contacts;

converting the measured values of the electrical output at said second terminal means obtained with the pedal input in said one and another known positions into a range of acceptable values at which said third movable switch contact should switch between said first and second fixed switch contacts;

operating the pedal input from a position within one of said idle and non-idle ranges to a position within the other of said idle and non-idle ranges and during such operation both measuring the value of the electrical output at said second terminal means at which said third movable switch contact ceases making contact with said first fixed switch contact and measuring the value of the electrical output at said second terminal means at which said third movable switch contact begins making contact with said second switch contact;

and comparing the values measured during said operating step with said range of acceptable values obtained as a result of said converting step.

14. In a method as set forth in claim 13, a further operating step of:

operating the pedal input from a position within said other of said idle and non-idle ranges to a position within said one of said idle and non-idle ranges and during such operation measuring both the value of the electrical output at said second terminal means at which said third movable switch contact ceases making contact with said second fixed switch contact and the value of the electrical output at said second terminal means at which said third movable switch contact begins making contact with said first fixed switch contact;

and wherein said comparing step further comprises comparing the values measured during said further operating step with said range of acceptable values obtained as a result of said converting step.

15. In a method as set forth in claim 14 wherein said first-mentioned operating step comprises operating the pedal input from idle position to full throttle position; and said further operating step comprises operating the pedal input from full throttle position to idle position.

16. In a method as set forth in claim 13, wherein said applying and operating steps are performed while sensor is in such an automotive vehicle by inserting a jumper wiring harness between existing wiring harnesses of such a vehicle, such jumper wiring harness comprising indicator means for circuit association with said first, second, and third switch contacts for indicating the respective ceasing and beginning of said third movable switch contact making contact respectively with said first and second fixed switch contacts.

17. In a method as set forth in claim 13, the step of converting the measured values of the electrical output at said second terminal means with the pedal input in said one and said another known positions into a range of acceptable values at which said third movable switch contact should switch between said first and second fixed switch contacts comprises converting by utilizing a calculator comprising a two-dimensional matrix wherein a first dimension comprises various values of the electrical output at said second terminal means when the pedal input is in said one known position and a second dimension comprises various values of the electrical output at said second terminal means when the pedal input is in said another known position, and wherein the intersection of each value of said first dimension with each value of said second dimension defines upper and lower limits of said range of acceptable values at which said third movable switch contact should switch between said first and second fixed switch contacts for the particular value of said first dimension and the particular value of said second dimension that define the intersection.

18. In a method as set forth in claim 17, wherein said calculator comprises two relatively positionable parts, one of which contains said first dimension and the other of which contains both said second dimension and the values at the intersections of the values of said first dimension with the values of said second dimension, and said converting step comprises relatively positioning said two parts to register a particular value of said second dimension relative to said one of said parts.

* * * * *